United States Patent
Kume et al.

(10) Patent No.: US 10,648,541 B2
(45) Date of Patent: May 12, 2020

(54) ROTARY ACTUATOR

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mikine Kume, Kariya (JP); Shinji Naito, Nagoya (JP); Hiroyuki Tateno, Nagoya (JP); Atsushi Kamada, Miyoshi (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 132 days.

(21) Appl. No.: 15/757,669

(22) PCT Filed: Sep. 5, 2016

(86) PCT No.: PCT/JP2016/075923
§ 371 (c)(1),
(2) Date: Mar. 6, 2018

(87) PCT Pub. No.: WO2017/047421
PCT Pub. Date: Mar. 23, 2017

(65) Prior Publication Data
US 2018/0340594 A1  Nov. 29, 2018

(30) Foreign Application Priority Data
Sep. 18, 2015  (JP) ................... 2015-184792

(51) Int. Cl.
*F16H 3/44*  (2006.01)
*F16H 61/32*  (2006.01)
(Continued)

(52) U.S. Cl.
CPC .............. *F16H 3/44* (2013.01); *F16H 61/32* (2013.01); *F16H 63/3491* (2013.01);
(Continued)

(58) Field of Classification Search
None
See application file for complete search history.

(56) References Cited

U.S. PATENT DOCUMENTS 3,015,971 A * 1/1962 Sauer .................. B62D 11/10
475/19
4,497,221 A * 2/1985 Koser .................. F16H 3/44
475/169
(Continued)

FOREIGN PATENT DOCUMENTS

| JP | 2001-271925 | 10/2001 |
| JP | 2003-028293 | 1/2003 |
| JP | 2012-222902 | 11/2012 |

*Primary Examiner* — Colby M Hansen
(74) *Attorney, Agent, or Firm* — Nixon & Vanderhye P.C.

(57) ABSTRACT

An actuator includes a manually operable portion that is operable to transmit rotation to an output shaft. The manually operable portion is provided such that the manually operable portion extends through a housing while at least a portion of the manually operable portion is exposed to an outside of the housing. In this way, even in a case where the actuator becomes inoperable, it is possible to change a shift range by rotating the output shaft through operation of the manually operable portion. It is only required to have a connection hole, which is conventionally provided at an outer wall of a transmission case, as a hole, which connects this rotary actuator to a shift range change mechanism. Therefore, it is sufficient to perform only a relatively small improvement, such as providing screw holes for fixing the actuator in a preexisting transmission.

4 Claims, 8 Drawing Sheets

(51) Int. Cl.
*F16H 63/34* (2006.01)
*F16H 61/28* (2006.01)
*F16H 57/02* (2012.01)

(52) U.S. Cl.
CPC ...... *F16H 63/3425* (2013.01); *F16H 63/3466* (2013.01); *F16H 2057/02034* (2013.01); *F16H 2061/2892* (2013.01); *F16H 2061/326* (2013.01)

(56) References Cited

U.S. PATENT DOCUMENTS

| | | | |
|---|---|---|---|
| 6,234,931 B1* | 5/2001 | Kanekura | F16H 3/44 475/149 |
| 9,676,463 B1* | 6/2017 | Fortl | B63H 23/08 |

* cited by examiner

ROTARY ACTUATOR

CROSS REFERENCE TO RELATED APPLICATION

This application is the U.S. national phase of International Application No. PCT/JP2016/075923 filed Sep. 5, 2016, which designated the U.S. and claims priority to Japanese Patent Application No. 2015-184792 filed on Sep. 18, 2015, the entire contents of each of which are hereby incorporated by reference.

TECHNICAL FIELD

The present disclosure relates to a rotary actuator.

BACKGROUND ART

A rotary actuator of an add-on type, which is used as a drive device for driving a shift-by-wire system of a vehicle transmission, has been known. This rotary actuator is fixed to an outer wall of a transmission case and is connected to a control rod of a shift range change mechanism through a connection hole formed in the transmission case. The shift range change mechanism changes a shift range of the transmission according to a rotational position of the control rod. When the rotational position of the control rod is a corresponding position that corresponds to a parking range, the shift range change mechanism locks rotation of the output shaft of the transmission.

In the shift-by-wire system that is constructed in the above described manner, when the rotary actuator becomes inoperable due to, for example, a failure of the rotary actuator in a state where the shift range is held in the parking range, the lock of the output shaft of the transmission cannot be released by the shift range change mechanism. In order to move the vehicle under this situation, it is necessary to lift drive wheels of the vehicle. In order to alleviate the above disadvantage, the shift-by-wire system disclosed in the patent literature 1 has an auxiliary change lever that is manually operable by an operator to change the shift range by rotating the control rod.

Normally, the auxiliary change lever of the above type is connected to the control rod placed in an inside of the transmission case through a cable. In such a case, a hole for inserting the cable needs to be formed at the transmission case, and a gap between this hole and the cable needs to be sealed. Therefore, in a case of newly installing the shift-by-wire system, it is necessary to develop a dedicated transmission, or to make significant improvements to the preexisting transmission, resulting in high costs. Therefore, the advantage of easy installation of the shift-by-wire system to the vehicle through use of the rotary actuator of the add-on type could be deteriorated.

CITATION LIST

Patent Literature

PATENT LITERATURE 1: JP2001-271925A

SUMMARY OF INVENTION

The present disclosure is made in view of the above point, and it is an objective of the present disclosure to provide a rotary actuator that enables easy installation of a shift-by-wire system to a vehicle while allowing manual change of a shift range at a time of a failure of the rotary actuator.

According to the present disclosure, there is provided a rotary actuator to be fixed to an outer wall of a transmission case of a vehicle transmission and to be used as a drive device for a shift-by-wire system, the rotary actuator including a motor, a speed reducing mechanism, a housing, an output shaft and a manually operable portion. The motor and the speed reducing mechanism are received in the housing. The speed reducing mechanism reduces a speed of rotation outputted from the motor. The output shaft is fixed to an output member of the speed reducing mechanism and transmits a rotational drive force, which is outputted from the output member, to a shift range change mechanism of the vehicle transmission. The manually operable portion is operable to transmit rotation to the output shaft and is provided such that the manually operable portion extends through the housing while at least a portion of the manually operable portion is exposed to an outside of the housing.

The rotary actuator, which is formed in the above-described manner, enables the change of the shift range by rotating the output shaft through operation of the manually operable portion even in the case where the actuator becomes inoperable. It is only required to have a connection hole, which is conventionally provided at the outer wall of the transmission case, as a hole, which connects this rotary actuator to the shift range change mechanism. That is, it is not required to separately form a hole, through which a cable for connecting the auxiliary change lever to the control rod is received, and it is not required to seal a gap between this hole and the cable. Therefore, it is sufficient to perform only a relatively small improvement, such as providing screw holes for fixing the rotary actuator at the preexisting transmission. Therefore, according to the present disclosure, the shift-by-wire system can be easily installed to the vehicle while enabling the manual change of the shift range at the time of, for example, failure.

DESCRIPTION OF EMBODIMENTS

Hereinafter, various embodiments of the present disclosure will be described with reference to the accompanying drawings. Portions, which are common among the embodi-

First Embodiment

Figure 1:
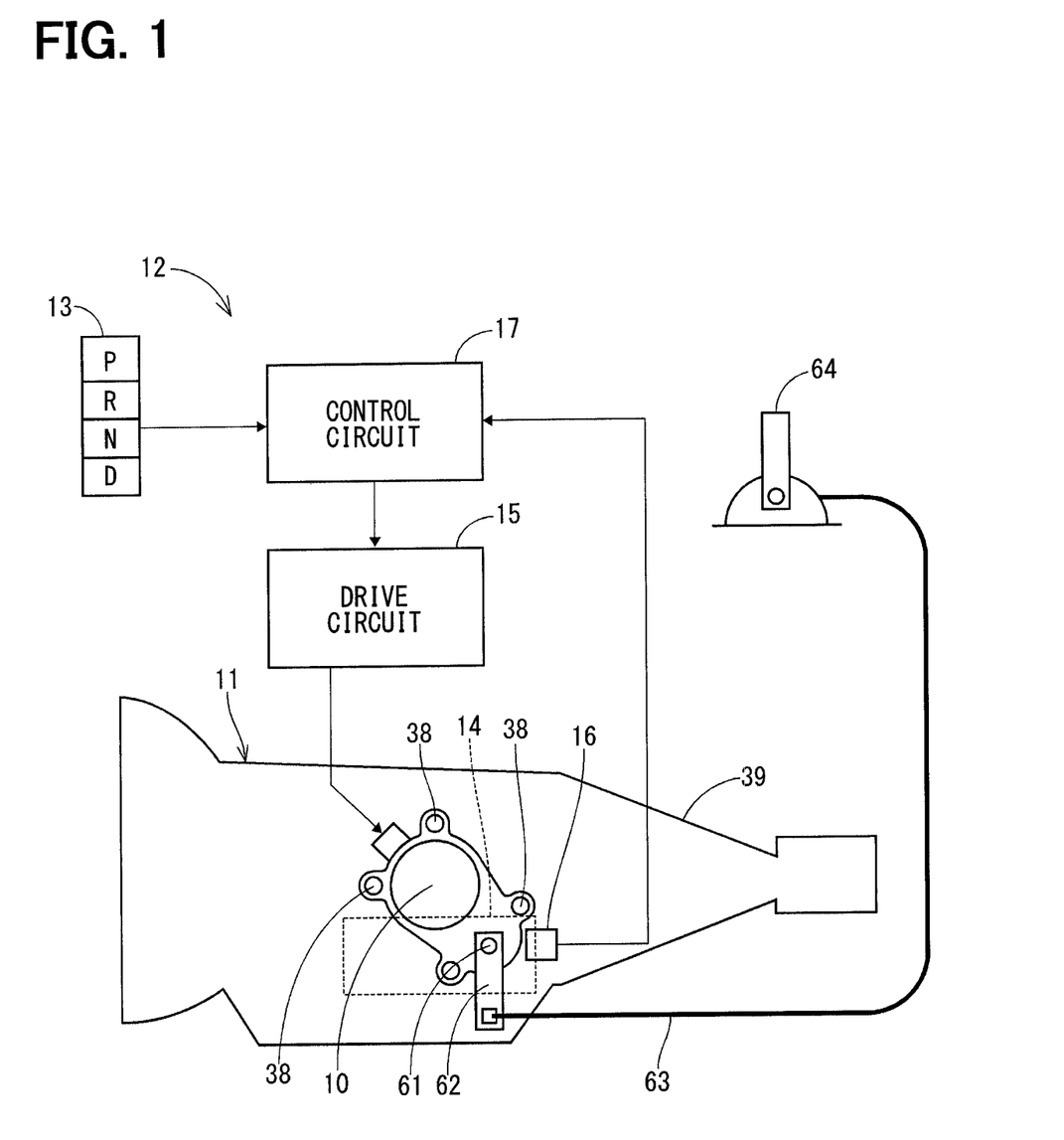
FIG. 1 is a diagram schematically indicating a shift-by-wire system, in which a rotary actuator according to a first embodiment of the present disclosure is applied.

FIG. 1 shows a rotary actuator according to a first embodiment of the present disclosure. The rotary actuator 10 is used as a drive device for driving a shift-by-wire system 12 of an automatic transmission 11. Hereinafter, the rotary actuator will be simply referred to as an actuator.
(Shift-by-Wire System)

First of all, a structure of the shift-by-wire system 12 will be described with reference to FIG. 1.

The shift-by-wire system 12 includes: a range command device 13, through which a driver of a vehicle commands a shift range of the automatic transmission 11; the actuator 10 for driving a shift range change mechanism 14 of the automatic transmission 11; a drive circuit 15 for driving the actuator 10; a rotational angle sensor 16, which senses a rotational angle of an output shaft of the actuator 10; and a control circuit 17. The control circuit 17 drives the actuator 10 through the drive circuit 15 such that the shift range of the automatic transmission 11 is set to a corresponding range, which corresponds to a shift command signal inputted from the range command device 13, in response to reception of the shift command signal, which is inputted from the range command device 13, and a measurement signal of the rotational angle sensor 16. Thereby the shift range change mechanism 14 is operated.

Figure 2:
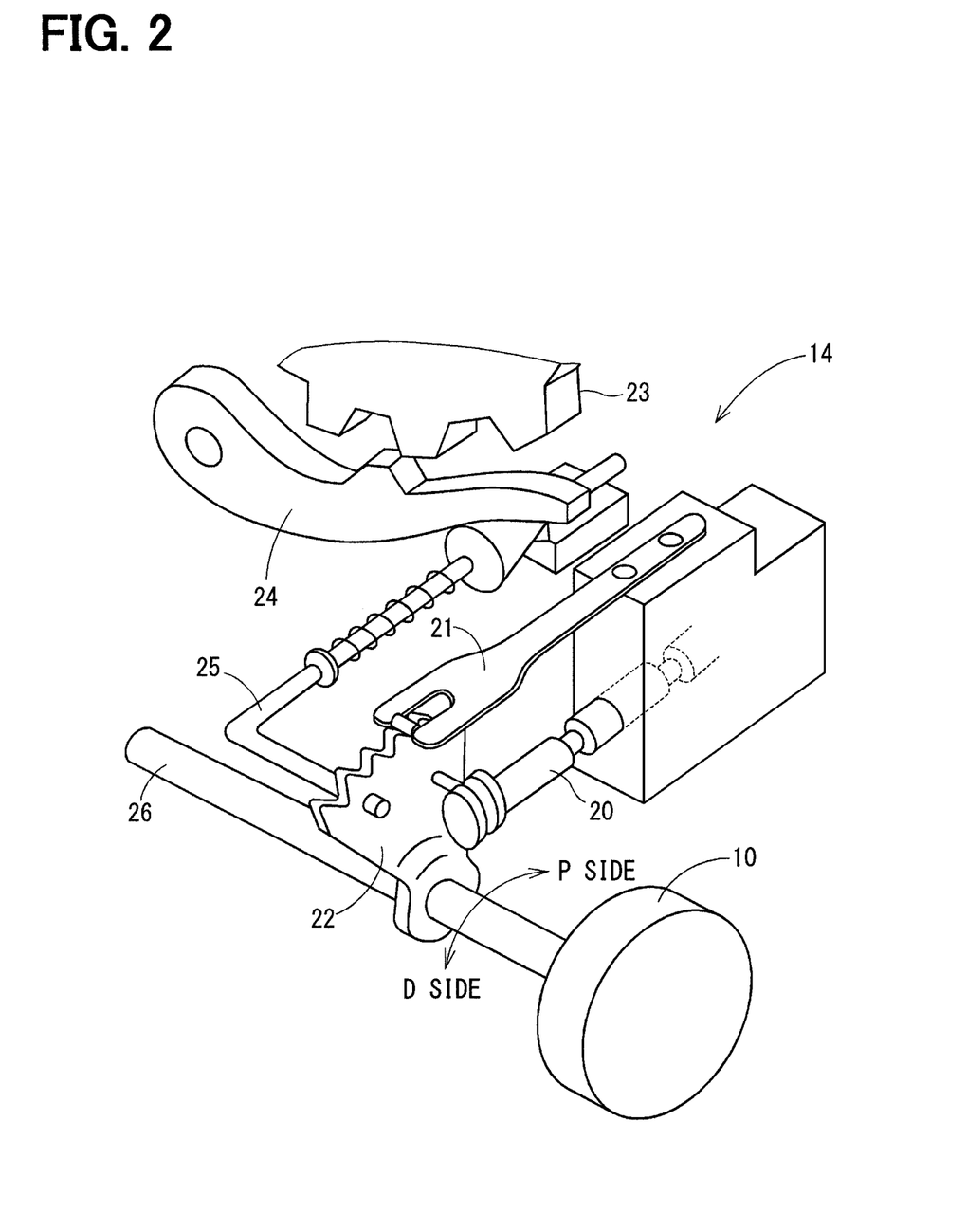
FIG. 2 is a descriptive diagram for describing a shift range change mechanism shown in FIG. 1.

The shift range change mechanism 14 is a mechanism that sequentially changes the shift range of the automatic transmission 11 in an order of a parking range, a reverse range, a neutral range and a drive range. Specifically, as shown in FIG. 2, the shift range change mechanism 14 includes: a range shift valve 20 that controls a change between coupling and decoupling of a frictional coupling device (not shown) of the automatic transmission 11 according to the shift range; a detent spring 21 and a detent lever 22 that hold a corresponding range; a park rod 25 that locks rotation of an output shaft of the automatic transmission 11 by fitting a park pole 24 to a park gear 23 installed to the output shaft when the shift range is changed to the parking range; and a control rod 26, to which the detent lever 22 is fixed.

The shift range change mechanism 14 controls each of the range shift valve 20 and the park rod 25 joined to the detent lever 22 to a corresponding shift position, which corresponds to the commanded range, by rotating the detent lever 22 about a central axis of the control rod 26 through rotation of the control rod 26. In the shift-by-wire system 12, an output shaft of the actuator 10 is directly connected to the control rod 26 to electrically change the shift range.
(Actuator)

Next, a structure of the actuator 10 will be described with reference to FIGS. 1 and 3.

Figure 3:
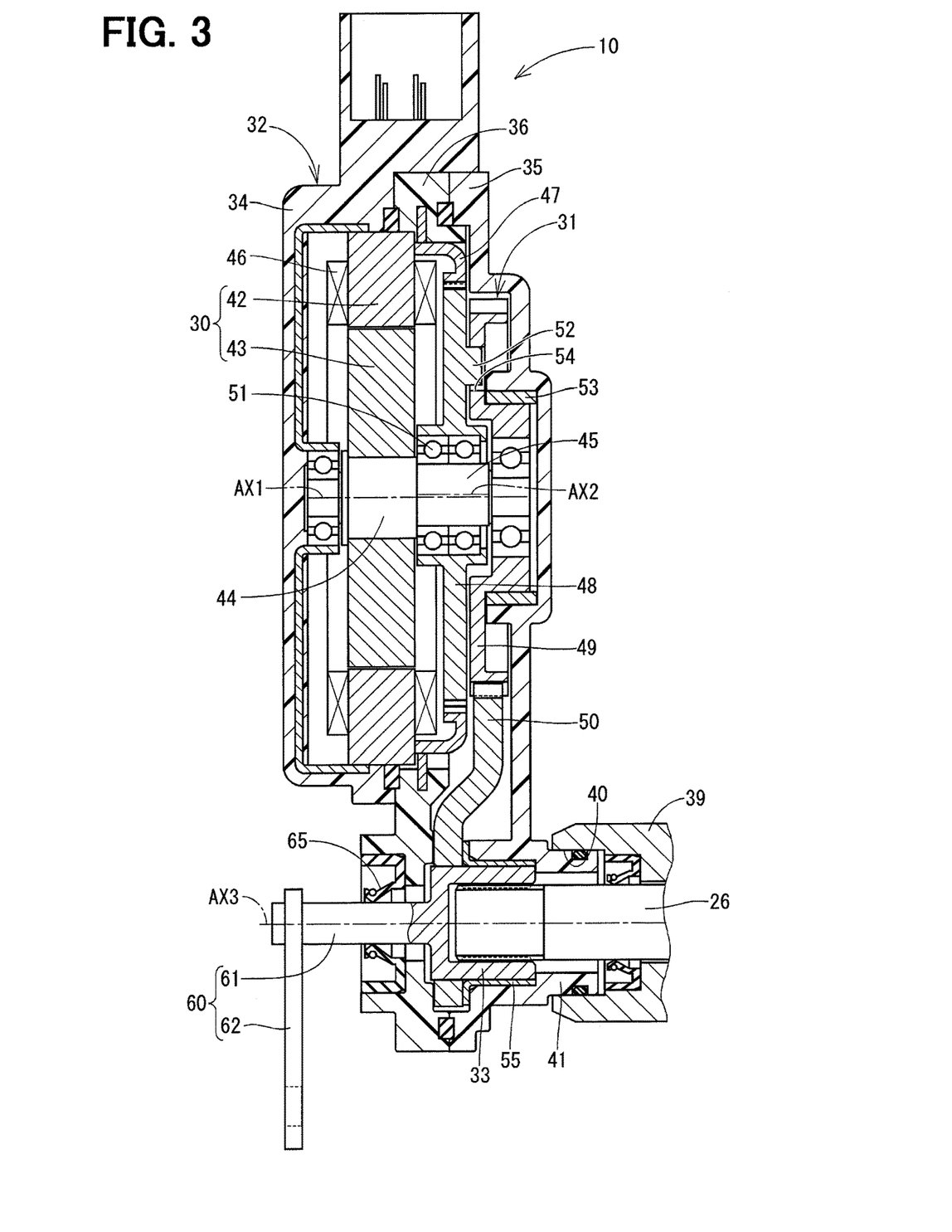
FIG. 3 is a cross-sectional view of the rotary actuator shown in FIG. 1.

As shown in FIG. 3, the actuator 10 includes: a motor (electric motor) 30 that serves as a drive source; a speed reducing mechanism 31 that reduces a speed of rotation outputted from the motor 30 at a predetermined speed reducing ratio; a housing 32 that receives the motor 30 and the speed reducing mechanism 31; and the output shaft 33 that is rotatably supported by the housing 32 and transmits the rotation, the speed of which is reduced by the speed reducing mechanism 31, to the control rod 26.

The housing 32 includes: a first housing portion 34; a second housing portion 35; and a third housing portion 36 that is placed between the first housing portion 34 and the second housing portion 35 while the first housing portion 34 and the second housing portion 35 are respectively shaped into a cup form. The first housing portion 34, the second housing portion 35 and the third housing portion 36 are fixed together by bolts (not shown).

The housing 32 is fixed to an outer wall of a transmission case 39 by bolts 38 (see FIG. 1). A connection hole 40 is formed at the transmission case 39. The second housing portion 35 includes a projecting part 41 that is shaped into a tubular form and is fitted into the connection hole 40. The control rod 26 is formed to project into an inside of the projecting part 41 through the connection hole 40.

The motor 30 includes: a stator 42 that is fixed to the housing 32; a rotor 43 that is placed in an inside of the stator 42; and a rotatable shaft 44 that is rotatable integrally with the rotor 43 about a rotational axis AX1. The rotatable shaft 44 includes an eccentric portion 45 that is placed at a corresponding location spaced from the rotor 43 in an axial direction and is eccentric to the rotational axis AX1. The motor 30 can rotate in each of two opposite rotational directions by controlling an electric current supplied to three phase windings 46 of the stator 42 through the control circuit 17 and can be stopped at a desirable rotational position.

The speed reduction mechanism 31 includes an internal gear 47, a planet gear 48, a first external gear 49, and a second external gear 50. The internal gear 47 is placed along the rotational axis AX1 and is fixed to the housing 32. The planet gear 48 is supported by the eccentric portion 45 through a bearing 51 such that the planet gear 48 is rotatable about an eccentric axis AX2 and is meshed with the internal gear 47 on a radially inner side of the internal gear 47. When the rotatable shaft 44 is rotated, the planet gear 48 makes a planetary motion such that the planet gear 48 revolves around the rotational axis AX1 while the planet gear 48 rotates about the eccentric axis AX2. At this time, a rotational speed of the planet gear 48 is reduced relative to a rotational speed of the rotatable shaft 44. The planet gear 48 forms a plurality of projections 52, which project in the axial direction and are used for transmitting the rotation.

The first external gear 49 is placed along the rotational axis AX1 and is supported by the second housing portion 35 through a bearing 53 such that the first external gear 49 is rotatable about the rotational axis AX1. Furthermore, the first external gear 49 includes a plurality of through-holes 54, into which the projections 52 are respectively inserted to transmit the rotation. The rotation of the planet gear 48 is transmitted to the first external gear 49 through engagement between each projection 52 and an inner wall of the corresponding through-hole 54. The second external gear 50 is placed along a rotational axis AX3 that is parallel with the rotational axis AX1 and is coaxial with the projecting part 41. The second external gear 50 is meshed with the first external gear 49 on a radially outer side of the first external gear 49. When the first external gear 49 is rotated about the rotational axis AX1, the second external gear 50 is rotated about the rotational axis AX3. At this time, a rotational speed of the second external gear 50 is reduced relative to a rotational speed of the first external gear 49.

The output shaft 33 is placed along the rotational axis AX3 and is fixed to the second external gear 50 that is an output member of the speed reducing mechanism 31. The output shaft 33 is supported by the second housing portion 35 through a bearing 55 such that the output shaft 33 is rotatable about the rotational axis AX3. The control rod 26 is inserted into an inside of the output shaft 33, which is shaped into a tubular form, such that the control rod 26 is coupled to the output shaft 33 in a manner that enables transmission of the rotation therebetween.

The actuator 10 further includes a manually operable portion 60 that can transmit rotation to the output shaft 33. The manually operable portion 60 includes a penetration rod 61 and an outer lever 62. The penetration rod 61 is coaxial with the output shaft 33 and is formed integrally with the output shaft 33 in one piece. The penetration rod 61 extends through the third housing portion 36 on an opposite side of the housing 32, which is opposite from the transmission case 39, so that a portion of the penetration rod 61 is exposed to an outside of the housing 32. A gap between the penetration rod 61 and the third housing portion 36 is sealed by an oil seal 65. One end part of the outer lever 62 is connected to the penetration rod 61 at the outside of the housing 32. Furthermore, as shown in FIG. 1, the other end part of the outer lever 62 is coupled to an auxiliary change lever 64, which serves as a P-lock release lever that is directly operable by an operator, through a cable 63.

(Advantages)

As discussed above, according to the first embodiment, the actuator 10 includes the manually operable portion 60 that can transmit the rotation to the output shaft 33. The manually operable portion 60 extends through the housing 32 such that at least the portion of the manually operable portion 60 is exposed to the outside of the housing 32.

The actuator 10, which is formed in the above-described manner, enables the change of the shift range by rotating the output shaft 33 through operation of the manually operable portion 60 even in the case where the actuator 10 becomes inoperable. It is only required to have the connection hole 40, which is conventionally provided at the outer wall of the transmission case 39, as the hole, which connects the rotary actuator 10 to the shift range change mechanism 14. That is, it is not required to separately form a hole, through which the cable for connecting the auxiliary change lever 64 to the control rod 26 is received, and it is not required to seal a gap between this hole and the cable. Therefore, it is sufficient to perform only a relatively small improvement, such as providing screw holes for fixing the actuator 10 in the preexisting transmission. Therefore, according to the present embodiment, the shift-by-wire system 12 can be easily installed to the vehicle while enabling the manual change of the shift range at the time of, for example, failure.

Furthermore, according to the first embodiment, the output shaft 33 is placed along the axis that is different from the axis of the motor 30. The manually operable portion 60 is placed coaxially with the output shaft 33 and includes: the penetration rod 61 that extends through the third housing portion 36 on the opposite side of the housing 32, which is opposite from the transmission case 39; and the outer lever 62 that is connected to the penetration rod 61 at the outside of the housing 32. Therefore, even in the case where the actuator 10 becomes inoperable, the shift range can be changed by rotating the output shaft 33 via the penetration rod 61 through the operation of the outer lever 62. Furthermore, the gap between the penetration rod 61, which is a rotatable body, and the third housing portion 36, is sealed by the oil seal 65. Therefore, the seal performance can be improved in comparison to the conventional case where the gap between the cable, which is movable in the extending direction of the cable, and the hole of the transmission case, is sealed.

Furthermore, according to the first embodiment, the penetration rod 61 is formed integrally with the output shaft 33 in one piece. Therefore, the penetration rod 61 can be provided without increasing the number of components.

Second Embodiment

Figure 4:
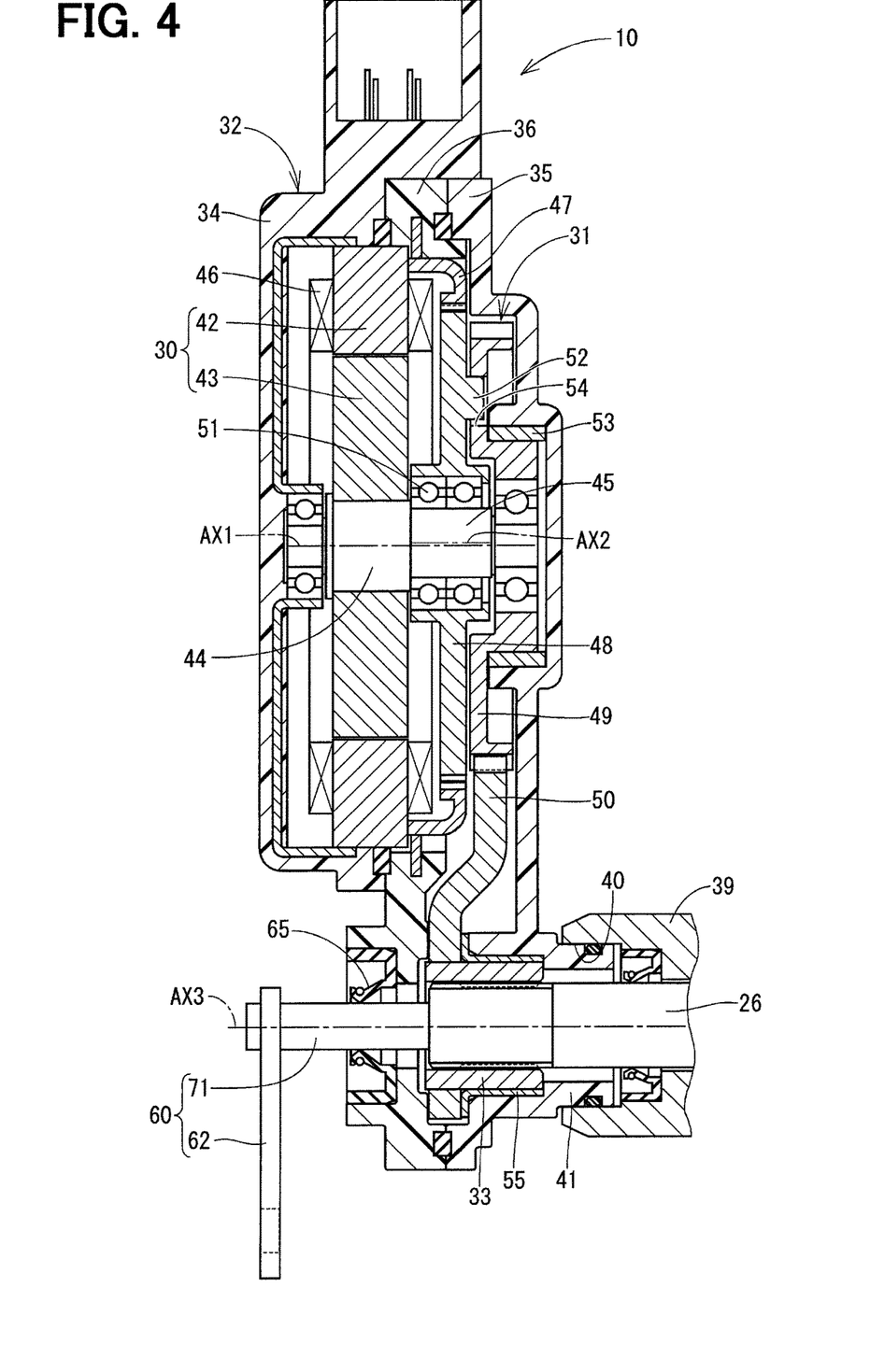
FIG. 4 is a cross-sectional view of a rotary actuator according to a second embodiment of the present disclosure.

In a second embodiment of the present disclosure, as shown in FIG. 4, a penetration rod 71 is formed integrally with the control rod 26 in one piece. Therefore, the penetration rod 71 can be provided without increasing the number of components.

Third Embodiment

Figure 5:
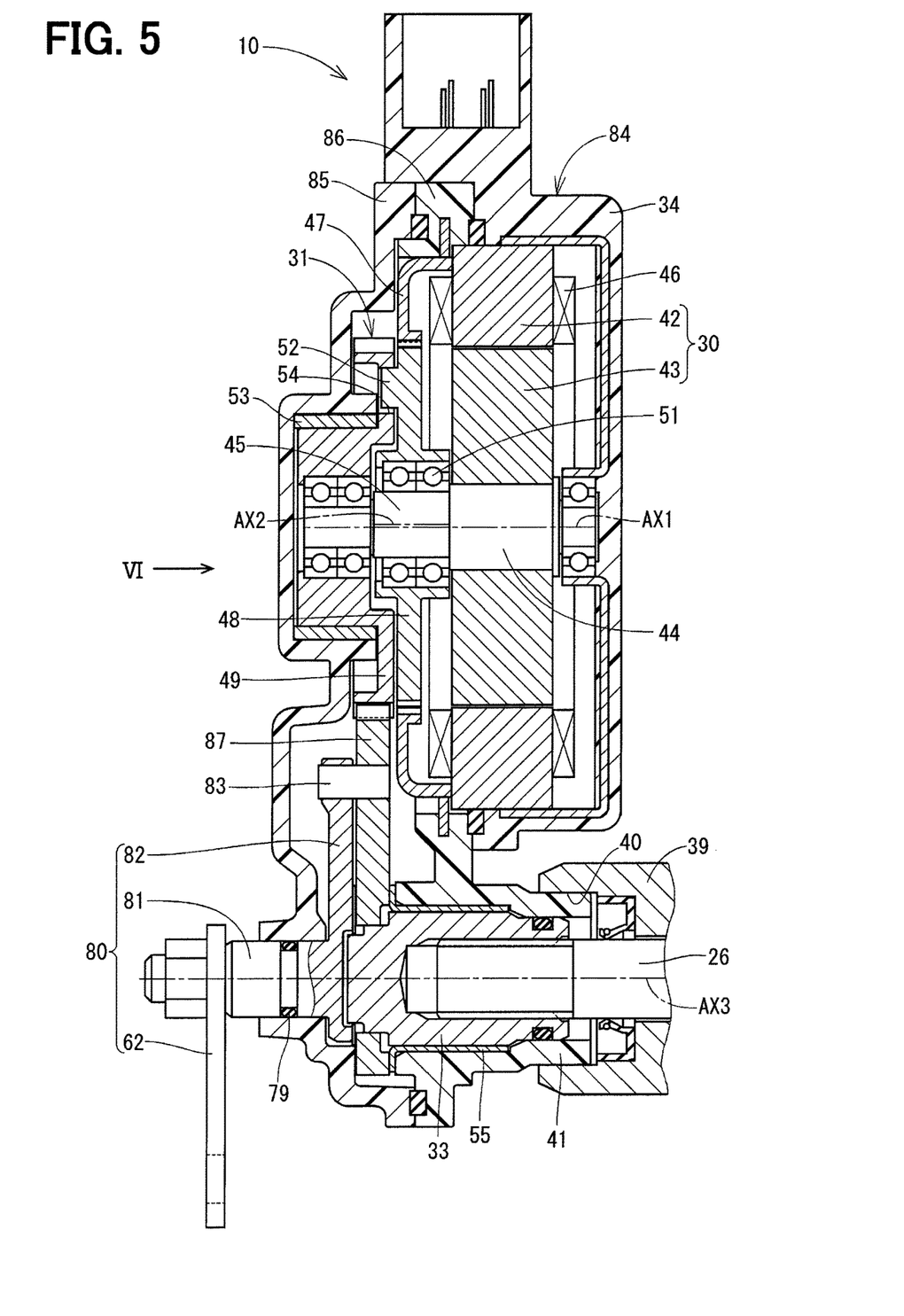
FIG. 5 is a cross-sectional view of a rotary actuator according to a third embodiment of the present disclosure.
Figure 6:
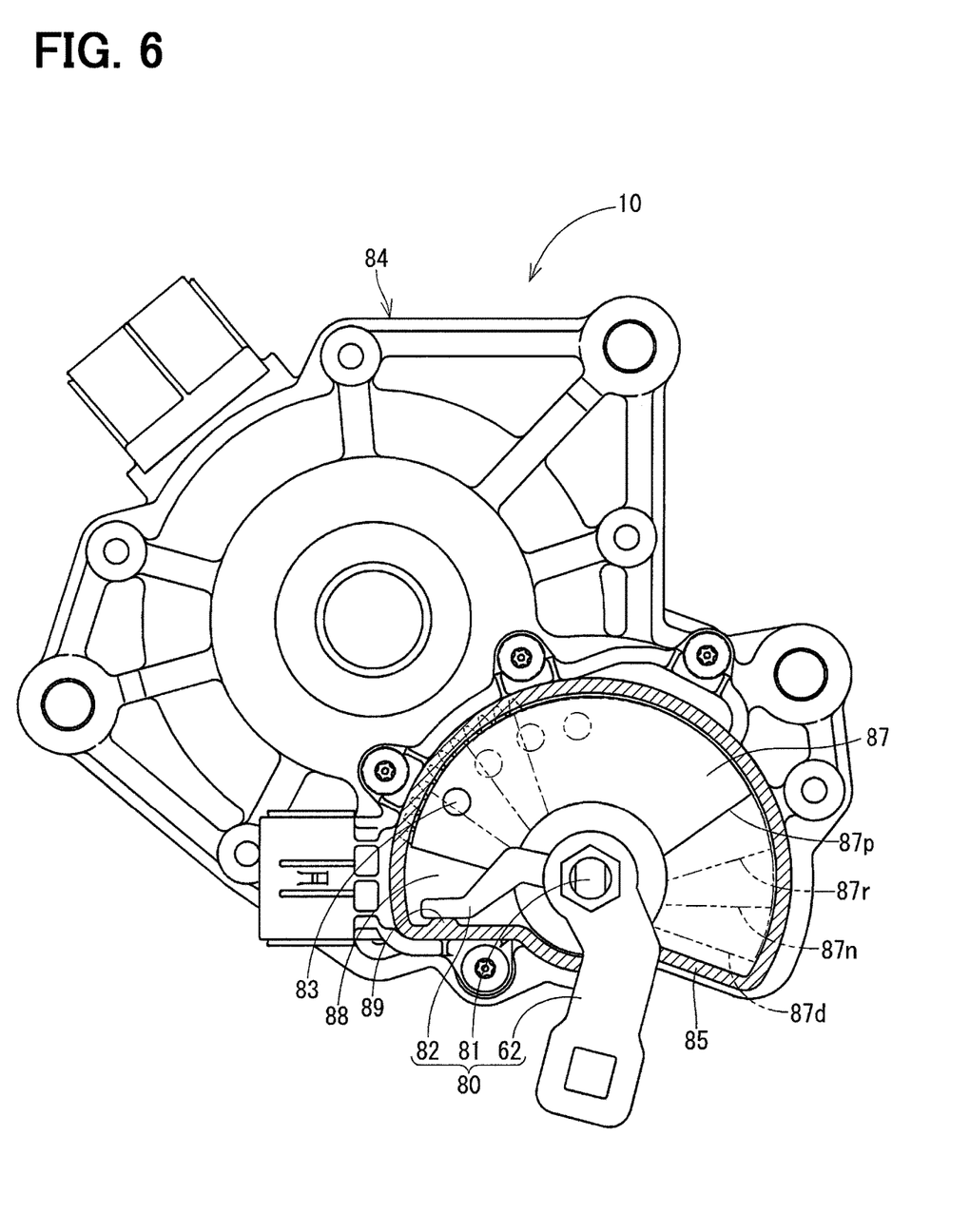
FIG. 6 is a view of the rotary actuator taken in a direction of an arrow VI in FIG. 5 while a portion of a housing is partially fragmented.

In a third embodiment of the present disclosure, as shown in FIGS. 5 and 6, a manually operable portion 80 includes a penetration rod 81, the outer lever 62 and an engaging arm 82. The outer lever 62 is connected to the penetration rod 81 at an outside of a housing 84. The engaging arm 82 projects radially outwardly from the penetration rod 81 at an inside of the housing 84.

An output member 87 includes an engaging pin 83 that projects in the axial direction to enable engagement of the engaging pin 83 with the engaging arm 82 when the penetration rod 81 is rotated about the rotational axis AX3.

The housing 84 includes the first housing portion 34, a second housing portion 85 and a third housing portion 86. In the present embodiment, the projecting part 41 is formed at the second housing portion 85. The penetration rod 81 penetrates through the second housing portion 85. A gap between the penetration rod 81 and the second housing portion 85 is sealed by an O-ring 79.

Figure 7:
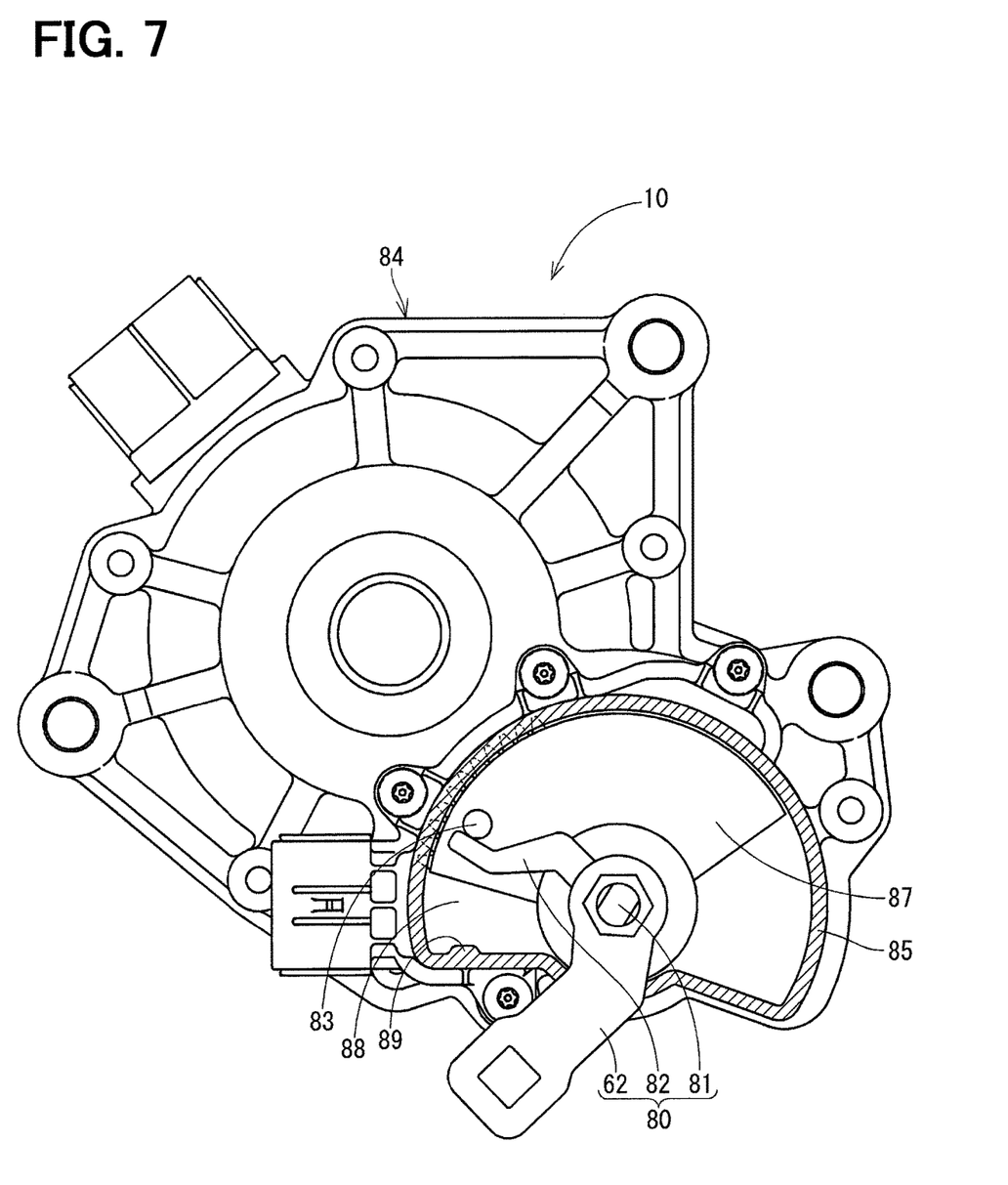
FIG. 7 is a view that is similar to FIG. 6 and shows a state where a penetration rod of a manually operable portion is rotated from a state shown in FIG. 6, and thereby an engaging arm contacts an engaging pin.

As shown in FIG. 6, the housing 84 includes an evacuation space 88, into which the engaging arm 82 is evacuated, so that the engaging arm 82 and the engaging pin 83 do not contact with each other at a time period of rotating the output member 87 to a corresponding one of rotational positions 87p, 87r, 87n, 87d, which respectively correspond to all of shift ranges (the P-range, the R-range, the N-range and the D-range in the present embodiment). That is, in a non-operating state of the manually operable portion 80, the engaging arm 82 and the engaging pin 83 are placed to have the positional relationship of that the engaging arm 82 and the engaging pin 83 do not contact with each other. In the present embodiment, the engaging arm 82 contacts an inner wall 89 of the second housing portion 85 in the non-operating state of the manually operable portion 80. Then, at the time of operating the manually operable portion 80, as shown in FIG. 7, the engaging arm 82 is rotated together with the penetration rod 81 and contacts the engaging pin 83, and the engaging arm 82 pushes the engaging pin 83 to rotate the output member 87.

With the above-described construction, it is possible to avoid the rotation of the auxiliary change lever 64 every time the shift range is changed during the normal operation time of the actuator 10.

Therefore, it is not required to provide a decoupling mechanism, which decouples the transmission of the rotation, to, for example, the cable 63 for the purpose of limiting the rotation of the auxiliary change lever 64 at the normal change time of changing the shift range. In a case where the decoupling mechanism discussed above is provided at an outside of a cabin of the vehicle, locking of the decoupling mechanism may possibly occur when a foreign object, such as gravel, is caught by a movable portion of the decoupling mechanism.

Now, inconvenience of forming the penetration rod 71 integrally with the control rod 26 like in the second embodiment will be described. In the second embodiment, at the time of disassembling the actuator 10 from the transmission case 39, it is necessary to completely pull out the housing 32 not only from the control rod 26 but also from the penetration rod 71. Therefore, when there is no sufficient space on the side of the actuator 10, which is opposite from the transmission case 39, there is a disadvantage of that the actuator 10 cannot be disassembled from the transmission case 39.

In contrast, in the third embodiment, the penetration rod 81 is a separate member that is formed separately from the control rod 26. Therefore, at the time of disassembling the actuator 10 from the transmission case 39, it is only required to completely pull out the housing 32 from the control rod 26. Thus, even in the case where there is no sufficient space on the side of the actuator 10, which is opposite from the transmission case 39, it is possible to disassemble the actuator 10 from the transmission case 39.

Other Embodiments

Figure 8:
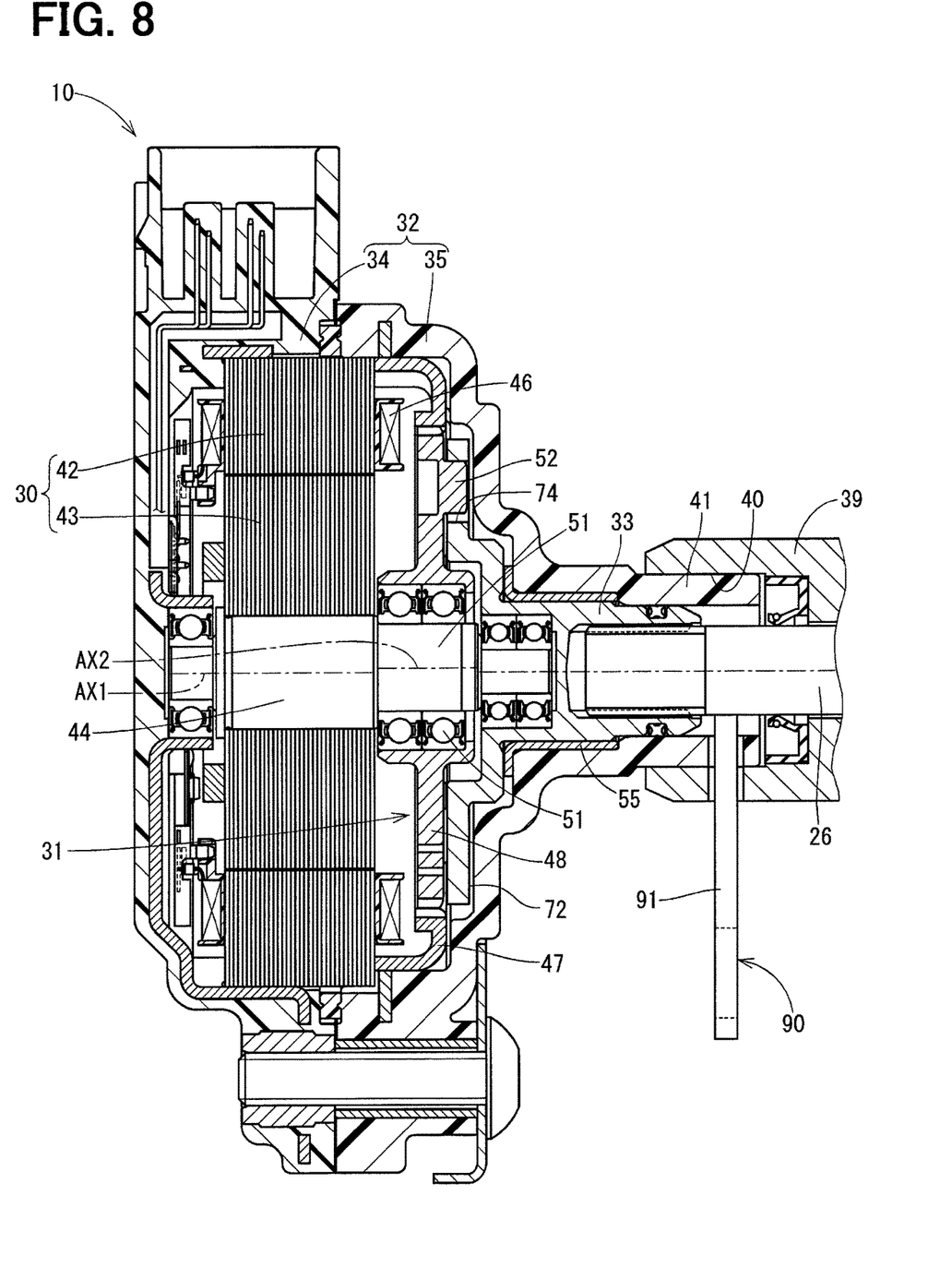
FIG. 8 is a cross-sectional view of a rotary actuator according to another embodiment of the present disclosure.

In another embodiment of the present disclosure, as shown in FIG. 8, the output shaft 33 may be formed coaxially with the rotatable shaft 44. In this case, a manually operable portion 90 includes, for example, a lever 91 that is formed to radially outwardly project from the control rod 26. An end part of the lever 91, which projects to the outside of the transmission case 39, is connected to the auxiliary change lever 64 through the cable 63. Furthermore, the output shaft 33 is formed integrally with a flange 72 that radially outwardly projects from an end part of the output shaft 33 on the planet gear 48 side. The flange 72 serves as an output member of the present disclosure and includes a plurality of through-holes 74, into each of which a corresponding one of the projections 52 of the planet gear 48 is inserted to transmit the rotation. The rotation of the planet gear 48 at the time of driving the motor 30 is transmitted to the flange 72 through engagement of each of the projections 52 of the planet gear 48 to the inner wall of the corresponding one of the through-holes 74 of the flange 72 to rotate the output shaft 33.

The present disclosure is not necessarily limited to the above embodiments and may be implemented in various forms without departing from the principle of the present disclosure.

The invention claimed is:

1. A rotary actuator to be fixed to an outer wall of a transmission case of a vehicle transmission and to be used as a drive device for a shift-by-wire system, the rotary actuator comprising:
a motor;
a speed reducing mechanism that reduces a speed of rotation outputted from the motor;
a housing that receives the motor and the speed reducing mechanism;
an output shaft that is fixed to an output member of the speed reducing mechanism and transmits a rotational drive force, which is outputted from the output member, to a shift range change mechanism of the vehicle transmission; and
a manually operable portion that is operable to transmit rotation to the output shaft and is provided such that the manually operable portion extends through the housing while at least a portion of the manually operable portion is exposed to an outside of the housing, wherein:
the output member includes an engaging pin that projects in an axial direction;
the manually operable portion includes an engaging arm that radially outwardly projects in an inside of the housing; and
the housing includes an evacuation space, into which the engaging arm is evacuated, so that the engaging arm and the engaging pin do not contact with each other at a time period of rotating the output member to a corresponding one of rotational positions, which respectively correspond to all of shift ranges.

2. A rotary actuator to be fixed to an outer wall of a transmission case of a vehicle transmission and to be used as a drive device for a shift-by-wire system, the rotary actuator comprising:
a motor;
a speed reducing mechanism that reduces a speed of rotation outputted from the motor;
a housing that receives the motor and the speed reducing mechanism;
an output shaft that is fixed to an output member of the speed reducing mechanism and transmits a rotational drive force, which is outputted from the output member, to a shift range change mechanism of the vehicle transmission; and
a manually operable portion that is operable to transmit rotation to the output shaft and is provided such that the manually operable portion extends through the housing while at least a portion of the manually operable portion is exposed to an outside of the housing, wherein:
the output shaft is placed along an axis that is different from an axis of the motor;
the manually operable portion is placed coaxially with the output shaft and includes:
a penetration rod that extends through a portion of the housing, which is located on a side that is opposite from the transmission case;
an outer lever that is connected to the penetration rod at the outside of the housing; and
an engaging arm that radially outwardly projects from the penetration rod in an inside of the housing;
the output member includes an engaging pin that projects in an axial direction in such a manner that the engaging pin is engageable with the engaging arm when the penetration rod is rotated about an axis of the penetration rod; and
the housing includes an evacuation space, into which the engaging arm is evacuated, so that the engaging arm and the engaging pin do not contact with each other at a time period of rotating the output member to a corresponding one of rotational positions, which respectively correspond to all of shift ranges.

3. A rotary actuator to be fixed to an outer wall of a transmission case of a vehicle transmission and to be used as a drive device for a shift-by-wire system, the rotary actuator comprising:
a motor;
a speed reducing mechanism that reduces a speed of rotation outputted from the motor;
a housing that receives the motor and the speed reducing mechanism;
an output shaft that is fixed to an output member of the speed reducing mechanism and transmits a rotational drive force, which is outputted from the output member, to a shift range change mechanism of the vehicle transmission; and
a manually operable portion that is operable to transmit rotation to the output shaft and is provided such that the manually operable portion extends through the housing while at least a portion of the manually operable portion is exposed to an outside of the housing, wherein:

the manually operable portion is a separate member that is formed separately from a control rod of the shift range change mechanism.

4. The rotary actuator according to claim 3, wherein the manually operable portion is formed integrally with the output shaft in one piece.

* * * * *